(12) United States Patent
Biehl et al.

(10) Patent No.: US 10,995,691 B2
(45) Date of Patent: May 4, 2021

(54) METHOD AND DEVICE FOR CONTROLLING KNOCKING IN AN INTERNAL COMBUSTION ENGINE

(71) Applicant: Robert Bosch GmbH, Stuttgart (DE)

(72) Inventors: Matthias Biehl, Krottelbach (DE); Carsten Kluth, Stuttgart (DE); Jasmin Dieringer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/758,582

(22) PCT Filed: Oct. 15, 2018

(86) PCT No.: PCT/EP2018/078062
§ 371 (c)(1),
(2) Date: Apr. 23, 2020

(87) PCT Pub. No.: WO2019/091706
PCT Pub. Date: May 16, 2019

(65) Prior Publication Data
US 2020/0347794 A1 Nov. 5, 2020

(30) Foreign Application Priority Data

Nov. 13, 2017 (DE) .......................... 102017220129.0

(51) Int. Cl.
*F02D 41/24* (2006.01)
*F02D 35/02* (2006.01)
(Continued)

(52) U.S. Cl.
CPC ....... *F02D 41/2441* (2013.01); *F02D 35/027* (2013.01); *F02D 41/1401* (2013.01);
(Continued)

(58) Field of Classification Search
CPC ............... F02D 41/2441; F02D 35/027; F02D 41/1401; F02D 2041/1432; F02D 2200/101; G01L 23/221; F02P 5/152
(Continued)

(56) References Cited

U.S. PATENT DOCUMENTS 4,002,155 A * 1/1977 Hamed ................... F02P 5/152
123/406.39
4,111,035 A * 9/1978 West ........................ G01H 1/00
73/35.05
(Continued)

FOREIGN PATENT DOCUMENTS

DE 4332711 A1 3/1995
DE 10220600 A1 12/2003
(Continued)

OTHER PUBLICATIONS

International Search Report for PCT/EP2018/078062, dated Dec. 13, 2018.

*Primary Examiner* — Sizo B Vilakazi
*Assistant Examiner* — Brian R Kirby
(74) *Attorney, Agent, or Firm* — Norton Rose Fulbright US LLP; Gerard Messina

(57) ABSTRACT

A method and a device for controlling knocking in an internal combustion engine. A knock signal of a cylinder of the internal combustion engine is measured by a knock sensor and from that, a knock feature is generated. The knock feature is compared to a reference level in order to classify a combustion as a knocking or non-knocking combustion. The reference level is formed in consideration of a plurality of corrected knock features, the corrected knock features being formed from the knock features by determining map values from a program map as a function of operating parameters of the internal combustion engine and linking them additively, or by carrying out a low-pass
(Continued)

filtering, or by determining map values from a program map as a function of operating parameters of the internal combustion engine and linking them additively and carrying out a low-pass filtering.

9 Claims, 1 Drawing Sheet

(51) Int. Cl.
 *F02D 41/14* (2006.01)
 *G01L 23/22* (2006.01)
(52) U.S. Cl.
 CPC .......... *G01L 23/221* (2013.01); *G01L 23/226* (2013.01); *G01L 23/227* (2013.01); *F02D 2041/1432* (2013.01); *F02D 2200/101* (2013.01)
(58) Field of Classification Search
 USPC ....... 701/111; 73/35.01, 35.03, 35.04, 35.05, 73/35.06
 See application file for complete search history.

(56) References Cited

U.S. PATENT DOCUMENTS

| | | | | |
|---|---|---|---|---|
| 4,233,836 A * | 11/1980 | Yoneda | ................... | G01H 1/00 73/35.03 |
| 4,333,334 A * | 6/1982 | Nakajima | ............... | F02P 5/152 73/35.05 |
| 4,420,967 A * | 12/1983 | Enoshima | ............. | G01L 23/225 73/35.05 |
| 4,463,722 A * | 8/1984 | Kobayashi | ............ | G01L 23/225 73/35.05 |
| 4,466,406 A * | 8/1984 | Hartung | ................ | F02D 35/027 123/406.39 |
| 4,467,634 A * | 8/1984 | Rohde | ................... | H03K 5/082 73/35.03 |
| 4,476,709 A * | 10/1984 | Hattori | .................. | G01L 23/225 73/35.05 |
| 4,478,068 A * | 10/1984 | Bonitz | .................. | G01L 23/225 701/111 |
| 4,489,692 A * | 12/1984 | Haraguchi | ............ | F02P 5/1521 123/406.36 |
| 4,498,331 A * | 2/1985 | Nakamura | ............ | G01L 23/225 701/111 |
| 4,501,137 A * | 2/1985 | Aoki | ...................... | G01L 23/225 123/406.33 |
| 4,527,525 A * | 7/1985 | Mauermann | .......... | F02P 5/1523 123/406.37 |
| 4,583,175 A * | 4/1986 | Abe | ...................... | F02P 5/1525 701/111 |
| 4,593,553 A * | 6/1986 | Bonitz | .................. | G01L 23/225 73/35.04 |
| 4,596,217 A * | 6/1986 | Bonitz | .................. | F02P 5/1521 123/406.36 |
| 4,640,250 A * | 2/1987 | Hosaka | ................... | F02P 5/152 123/406.35 |
| 4,750,103 A * | 6/1988 | Abo | ....................... | G01L 23/225 701/111 |
| 4,770,144 A * | 9/1988 | Sakakibara | ........... | F02P 5/1525 123/406.35 |
| 5,040,510 A * | 8/1991 | Krebs | ..................... | F02P 5/152 123/406.37 |
| 5,083,278 A * | 1/1992 | Matsuura | .............. | G01L 23/225 123/406.35 |
| 5,088,044 A * | 2/1992 | Matsuura | .............. | G01L 23/225 123/406.35 |
| 5,109,820 A * | 5/1992 | Iwata | ..................... | F02P 5/152 123/406.37 |
| 5,140,962 A * | 8/1992 | Iwata | .................... | G01L 23/225 123/406.35 |
| 5,190,011 A * | 3/1993 | Hashimoto | ............. | F02P 5/152 123/406.38 |
| 5,215,058 A * | 6/1993 | Sakakibara | ............. | F02P 5/152 123/406.38 |
| 5,287,837 A | 2/1994 | Hashimoto et al. | | |
| 5,400,644 A * | 3/1995 | Remboski, Jr. | ........ | G01L 23/225 701/111 |
| 5,517,969 A | 5/1996 | Unland et al. | | |
| 5,743,233 A * | 4/1998 | Unland | .................. | G01L 23/225 123/406.37 |
| 5,929,322 A * | 7/1999 | Aoki | ...................... | G01L 23/225 73/35.08 |
| 6,145,491 A * | 11/2000 | Wilstermann | .......... | F02P 17/12 123/406.35 |
| 6,591,660 B1 * | 7/2003 | Franke | .................. | G01L 23/221 73/35.03 |
| 6,868,330 B2 * | 3/2005 | Saikkonen | ............ | F02D 35/027 123/406.16 |
| 7,263,872 B2 * | 9/2007 | Danet | ................... | G01L 23/225 123/406.16 |
| 8,326,518 B2 * | 12/2012 | Komatsu | ............... | G01L 23/221 701/111 |
| 8,965,666 B2 * | 2/2015 | Matsushima | .......... | F02P 5/152 701/111 |
| 2007/0067091 A1 * | 3/2007 | Takemura | ............. | G01L 23/225 701/111 |
| 2007/0084266 A1 * | 4/2007 | Kaneko | ................. | G01L 23/225 73/35.03 |
| 2013/0192343 A1 * | 8/2013 | Tanaka | ................ | F02D 41/1401 73/35.01 |
| 2016/0123249 A1 * | 5/2016 | Sakayanagi | ........... | F02D 35/023 701/111 |

FOREIGN PATENT DOCUMENTS

| | | | |
|---|---|---|---|
| DE | 102014102324 A1 | 8/2015 | |
| DE | 102014224800 A1 | 6/2016 | |
| EP | 3018324 A1 | 5/2016 | |
| WO | 2004079319 A1 | 9/2004 | |
| WO | WO-2004079319 A1 * | 9/2004 | .......... F02D 35/027 |
| WO | 2014071900 A1 | 5/2014 | |

* cited by examiner

METHOD AND DEVICE FOR CONTROLLING KNOCKING IN AN INTERNAL COMBUSTION ENGINE

FIELD

The present invention relates to a method and a device for controlling knocking in an internal combustion engine.

BACKGROUND INFORMATION

German Patent Application No. DE 10 2014 224 800 A1 describes a method for controlling knocking, in which a knock signal of a cylinder is measured by a knock sensor, and from that, a knock feature is generated. In order to judge whether a combustion is knocking or non-knocking, the knock feature is compared to a reference level. In this case, the reference level is calculated from previous knock features by sliding-mode mean value generation.

SUMMARY

An example method of the present invention and an example device of the present invention may have the advantage that formation of the reference level from the knock features is improved. In particular, an additive linkage with values from an operating-parameters-dependent program map may therefore be carried out or a low-pass filtering may be performed, or it is possible both to take additive map values from a program map into account and to carry out a low-pass filtering. The operation of an internal combustion engine may be optimized by this processing of knock features in order to form a corrected knock feature, from which the reference level is then formed. Thus, advantages in terms of fuel consumption may be realized, that is, the occurrence of harmful knocking may be minimized. In particular, the control quality of the internal combustion engine with respect to knocking is thus improved.

Further advantages and improvements are described herein. The influence of the program map on the improved quality of the formation of the reference level depends largely on the quality of the data contained in the program map. Specifically, high quality of this data may be ensured by determining meaningful data for the additive program map during an application engineering phase, by measurements on the internal combustion engine or on the type of internal combustion engine. This determination is accomplished especially easily if, to that end, intensities of the knock features are determined during steady-state operation. Notably, the program maps may thus include information concerning disturbing signals which have no relation to knocking events in the combustion chamber. If such disturbing signals are not removed, they go into the formation of the reference level and lead to an increase of the reference level and a deterioration of the detection of knocking signals in ranges in which these disturbing signals no longer occur.

Furthermore, there may be ranges of operating parameters in which knocking certainly does not occur, and at the same time, the knock features have only low values. A reference level which is learned in such operating ranges is particularly low, and leads to a combustion being judged incorrectly as knocking in other operating ranges. That is why it is expedient to add a base value to the knock features in such operating ranges, so that the reference level does not drop to a meaninglessly low value. The operating ranges of the program map are denoted particularly simply by load and speed. In addition, by multiplication with a further map value, the influence of the knock features of certain ranges of operating parameters are able to be weighted. Thus, certain ranges of operating parameters may be taken to a greater or lesser extent into account for forming the reference level. The low-pass filtering is particularly useful if an additive component was subtracted from the knock features beforehand. The low-pass filtering is then carried out only with respect to the differences, so that this value becomes especially meaningful. To form the reference level, after the low-pass filtering, these values are then added again and by multiplication with the further map values, are taken into account accordingly for forming the reference level. A further possibility is to use this weighting only for the low-pass-filtered knock features, from which the map values were subtracted beforehand. The influence of the low-pass filtering is thus adjusted separately.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
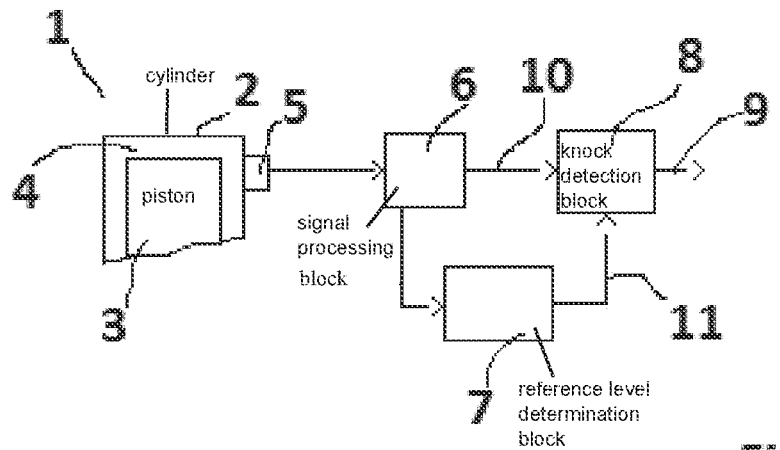
FIG. 1 an internal shows combustion engine with a knock control.

An internal combustion engine 1 is shown schematically in FIG. 1, in which a cylinder 2 with a piston 3 contained in it forms a combustion chamber 4. On the outer side of cylinder 2, knock sensor 5 is represented, which measures a knock signal of cylinder 2. Such a knock signal is a matter of a noise signal or vibrations of cylinder 2, which develop because of combustion processes in combustion chamber 4. The knock signals of knock sensor 5 are passed on to a signal-processing block 6, which from them, generates knock features 10 for each combustion. For each combustion process in cylinder 2, a knock feature 10 is generated for this combustion. Ascertained knock features 10 are then forwarded to a reference-level-determination block 7. The reference-level-determination block determines a reference level 11 from forwarded knock features 10, which is then passed on to knock detection block 8. In addition, knock detection block 8 receives knock feature 10 of the instantaneous combustion from signal processing block 6, and based on a comparison of knock feature 10 to reference level 11, decides whether the combustion is to be classified as a knocking or non-knocking combustion. Accordingly, knock detection block 8 outputs a corresponding signal 9 that contains information as to whether or not the combustion was knocking.

The various processing blocks 6, 7, 8 may be realized jointly in one computer as corresponding software blocks. Accordingly, after an analog pre-filtering carried out if desired, the knock signal of knock sensor 5 would then be converted from analog to digital and would then be processed by corresponding processing blocks taking the form of software in a suitable microcomputer. For example, one possible form of the conversion of the knock signals into knock features lies in a Fourier transform and totalization of the energy contained in the respective frequency ranges. In this context, in particular, different frequency ranges may be given different weight, since some frequencies indicate a knocking event especially reliably. Alternatively, the knock signals may also be rectified and integrated, which likewise produces a knock feature 10 that indicates the magnitude of the combustion in combustion chamber 4.

In reference-level-determination block 7, the reference level is determined by evaluating a plurality of knock features 10, which are provided by signal-processing block 6. The conventional reference-level determination as described in German Patent Application No. DE 10 2014 224 800 is accomplished by performing a sliding-mode mean value generation over a multitude of knock features 10. To that end, usually an instantaneous knock feature is multiplied by a weighting factor G<1, and this value is then added to the previous reference level, which is multiplied by (1−G). The present invention now provides that this reference-level determination is thus no longer carried out, but rather, a corrected knock feature is first formed, which is then used to form the reference level.

Figure 2:
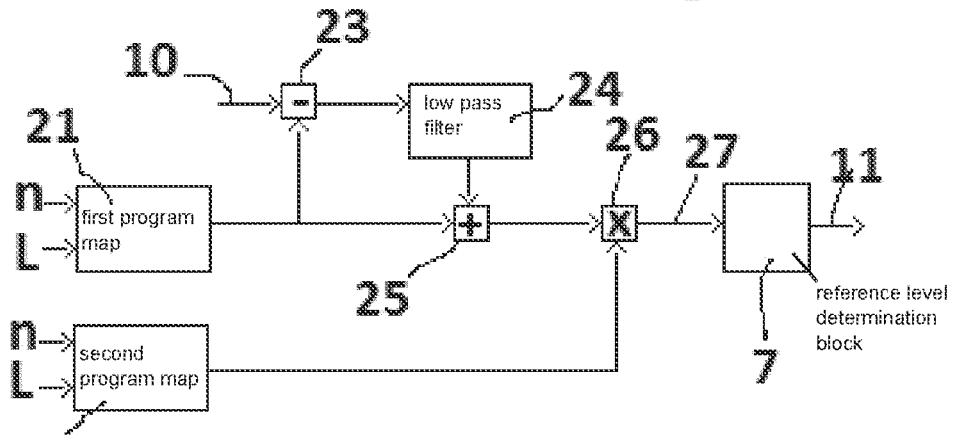
FIG. 2 shows a first exemplary embodiment of the reference-level determination.

FIG. 2 shows a first exemplary embodiment of the method according to the present invention for determining a reference level. FIG. 2 shows a first program map 21 and a second program map 22. Values are stored in these program maps depending on operating parameters of internal combustion engine 1, and these values are used as a function of the operating parameters of internal combustion engine 1 for the calculation in FIG. 2. For instance, speed n and load L of internal combustion engine 1 are shown here as examples for such operating parameters of the internal combustion engine. However, any operating parameters of the internal combustion engine may also be used for program maps 21, 22. Program maps 21 and 22 are produced during application engineering of internal combustion engine 1 or of the type of internal combustion engine 1.

Depending on the operating parameters of internal combustion engine 1, program map 21 provides a map value which is subtracted from knock feature 10 in summing point 23. Depending on the sign of the corresponding map value in program map 21, the computing step in summing point 23 is a reduction of or an addition to knock feature 10. For example, information concerning disturbing noises, which typically occur in certain operating-parameter ranges, may be stored in program map 21. These disturbance noises may be the speed-dependent switching of a valve or the load-dependent switching of a pump, for instance, which generates an additional vibration signal that is measured by knock sensor 5. Thus, by subtracting such information, knock feature 10 is reduced by these additional components, so that after summing point 23, knock feature 10 is present, reduced by these additional noise signals. Furthermore, program map 21 may also include information concerning operating ranges in which knocking does not occur, and at the same time, the knock feature has only a very low value. If an internal combustion engine is operated for a longer period of time in such an operating range, then without an additional influence, reference level 11 would assume a very low value, and knocking would therefore be detected falsely during subsequent operation in another operating range. In the case of longer operation in such an operating range, reference level 11 must thus be prevented from becoming too low. Therefore, for such operating ranges, characteristic values are stored in program map 21, by which a certain basic noise level is added to knock feature 10 at summing point 23. This addition of a basic noise level therefore prevents the knock feature from sinking too sharply.

Downstream of summing point 23 is a low pass 24, in which knock feature 10, with the additive influence by summing point 23, is smoothed. A sliding-mode mean value generation is carried out again by this low pass 24 over a plurality of knock features 10, reduced by the contribution of summing point 23. The result of low pass 24 is then supplied to a further summing point 25, the result of low pass 24 and the corresponding map value of program map 21 being added in summing point 25. In this context, the same map value is supplied to both summing points 23, 25. As already explained, depending on the physical cause, program map 21 may contain positive or negative values, which lead either to an addition or subtraction at summing point 23. It is essential here that in each instance, summing points 23 and 25 have a different sign. If the map value was subtracted in summing point 23, then it is added in summing point 25. If the map value was added in summing point 23, then it is subtracted again in summing point 25. Owing to this measure, only the difference between the map value of program map 21 and knock feature 10 is determined in low pass 24. In the case of disturbing noises, this means that only the knock feature, which does not trace back to the disturbing noises, was formed at the output of low pass 24. Naturally, this signal is particularly meaningful with respect to the occurrence or non-occurrence of knocking in internal combustion engine 1.

The processing of the knock signal which is output by summing point 25 may be influenced here depending on the data input of program map 21 or of low pass 24. For example, only the value zero may be entered consistently into program map 21. In such a development, there is no component which is added to or subtracted from knock feature 10, so that only low pass 24 is used for determining reference level 11. In the case of such a data input into program map 21, knock feature 10 is therefore subjected to a first low-pass filtering. Moreover, low pass 24 may also be designed with a very large time constant tending to infinity and be initialized with the value zero, so that the influence of low pass 24 tends to zero. Only the content of program map 21 would then be used for calculating reference level 11, which then corresponds to a reference level that was determined once and then stored in program map 21. Depending on the design of program map 21 and of the low pass, the influence of program map 21 or of low pass 24 may thus be adjusted variably between these two extreme positions.

A multiplication point 26 is then also located downstream of summing point 25. Multiplication point 26 multiplies the result of summing point 25 with a further map value that is taken from program map 22. By this multiplication, the respective preprocessed knock features may be weighted in view of the operating parameters of the internal combustion engine. In particular, certain operating ranges of the internal combustion engine, e.g., certain speed ranges and load ranges, may thus be weighted to a greater or lesser extent with respect to the formation of the reference level. For example, operating ranges in which typically strong disturbing noises and at the same time only minimal combustion noises occur, may be weighted relatively little, since these knock features contain only a very small share of information with respect to the combustions. The result of multiplication point 26 then forms a corrected knock feature 27, which is then supplied to a reference-level-determination block 7 for calculating reference level 11.

Based on corrected knock feature 27, a sliding-mode mean value generation is carried out again in reference-level determination block 7 in order to determine reference level 11. Further processing steps, which are not the subject matter of the present invention, however, may also be carried out in reference-level determination block 7, if desired.

The method of the present invention as was explained with reference to FIG. 2 makes it possible during the application engineering of the vehicle, that is, the input of data into the program maps of the control of the vehicle, to identify typical operating ranges relevant for the knock control and to take them into account by suitable additive measures or multiplicative measures for determining the reference level. For the case of disturbing noises which occur in certain operating ranges of the internal combustion engine, it is advantageous in this context to reduce knock features 10 by these disturbing noises, so that only the signal components which trace back to the combustion processes in combustion chamber 4 are considered in low-pass generation 24. In low pass 24, information is thus generated which permits a statement about the actual signal components developing during the combustion in combustion chamber 4. In the same way, operating ranges in which almost no knocking features are generated may be taken into account by an additive component, and thus the influence of operating ranges—in which certainly no knocking occurs—on the determination of the reference level may be reduced. Correspondingly, the weighting of the influence of certain ranges of the operating parameters on the determination of the reference level may be intensified or weakened by multiplication 26. Thus, certain operating ranges may be weighted to a greater or lesser extent for determining the reference level.

Figure 3:
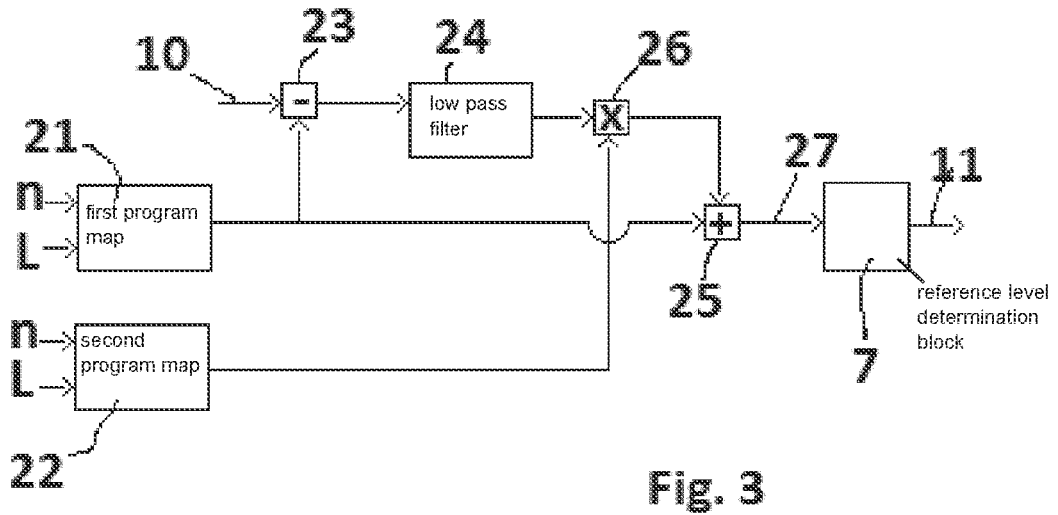
FIG. 3 shows a second example of the reference-level determination.

An alternative method to FIG. 2 is described in FIG. 3. Reference numerals 21, 22, 23, 24, 25, 26 and 7 denote the same objects as described in FIG. 2, which also have the same functions as was described in FIG. 2. In contrast to FIG. 2, the sequence of the individual processing steps differs, however. In particular, multiplication 26 is immediately downstream of the low-pass generation in block 24. Here, the influence of program map 22 via multiplication point 26 only applies directly to the output signal of low pass 24. Thus, only the deviations of knock features 10 in comparison to program map 21 are weighted by multiplication point 26. Owing to this procedure, as a result, the weighting from program map 22 only maintains an influence on the difference of knock features 10 in comparison to program map 21. Downstream of multiplication point 26, the map values stored in program map 21 are added again in summing point 25, to thus form corrected knock feature 27. This is then used again for the reference-level determination in block 7, in order to determine reference level 11.

What is claimed is:

1. A method for controlling knocking in an internal combustion engine, the method comprising the following steps:
    measuring, by a knock sensor, knock signals of a cylinder;
    generating, from the knock signals, knock features;
    comparing the knock features to a reference level; and
    classifying a combustion as a knocking combustion or non-knocking combustion, based on the comparing;
    wherein the reference level is formed taking in consideration a plurality of corrected knock features, the corrected knock features being formed from the knock features by determining map values from a program map as a function of operating parameters of the internal combustion engine, linking the map values additively to the knock features, and carrying out a low-pass filtering;
    wherein further map values are determined from a further program map as a function of the operating parameters of the internal combustion engine and are used multiplicatively to form the corrected knock features;
    wherein, to form the corrected knock features, the map values are subtracted from the knock features, results of the subtraction are then low-pass-filtered, the map values are then being added on again, and multiplication with the further map values is then carried out to form the corrected knock features.

2. The method as recited in claim 1, wherein the program map is a map determined in an application engineering phase by measurements on the internal combustion engine or on a type of internal combustion engine.

3. The method as recited in claim 1, wherein the program map, as a function of operating parameters of the internal combustion engine, indicates an intensity of the knock features during a steady-state operation.

4. The method as recited in claim 3, wherein the program map contains information concerning disturbing signals which can lead to an increase of the reference level.

5. The method as recited in claim 3, wherein the program map contains information concerning operating ranges in which knocking does not occur and values of the knock features are low.

6. The method as recited in claim 1, wherein the operating parameters include load and speed of the internal combustion engine.

7. A method for controlling knocking in an internal combustion engine, the method comprising the following steps:
    measuring, by a knock sensor, knock signals of a cylinder;
    generating, from the knock signals, knock features;
    comparing the knock features to a reference level; and
    classifying a combustion as a knocking combustion or non-knocking combustion, based on the comparing;
    wherein the reference level is formed taking in consideration a plurality of corrected knock features, the corrected knock features being formed from the knock features by determining map values from a program map as a function of operating parameters of the internal combustion engine, linking the map values additively to the knock features, and carrying out a low-pass filtering;
    wherein further map values are determined from a further program map as a function of the operating parameters of the internal combustion engine and are used multiplicatively to form the corrected knock features;
    wherein, to form the corrected knock features, the map values are subtracted from the knock features, results of the subtraction are then low-pass-filtered, multiplication with the further map values is then carried out, and the map values are then added on again to form the corrected knock features.

8. A device for controlling knocking in an internal combustion engine, knock signals of a cylinder of the internal combustion engine being measured by a knock sensor, the device configured to:
    receive the knock signal from the knock sensor;
    generate, from the knock signal, knock features;
    compare the knock features to a reference level;
    classify combustion as a knocking or non-knocking combustion based on the comparison;
    wherein the device is configured to form the reference level by taking into consideration a plurality of corrected knock features, and the device is configured to form the corrected knock features from the knock features by:
(i) determining map values from a program map as a function of operating parameters of the internal combustion engine, and linking the map values additively to the knock features, or (ii) carrying out a low-pass filtering, or (iii) determining map values from a program map as a function of the operating parameters of the internal combustion engine and linking the determined map values additively to the knock features, and carrying out a low-pass filtering;

wherein the device is configured to determine further map values from a further program map as a function of the operating parameters of the internal combustion engine and the further map values are used multiplicatively to form the corrected knock features;

wherein, to form the corrected knock features, the map values are subtracted from the knock features, results of the subtraction are then low-pass-filtered, the map values are then being added on again, and multiplication with the further map values is then carried out to form the corrected knock features.

9. A device for controlling knocking in an internal combustion engine, knock signals of a cylinder of the internal combustion engine being measured by a knock sensor, the device configured to:
receive the knock signal from the knock sensor;
generate, from the knock signal, knock features;
compare the knock features to a reference level;
classify combustion as a knocking or non-knocking combustion based on the comparison;
wherein the device is configured to form the reference level by taking into consideration a plurality of corrected knock features, and the device is configured to form the corrected knock features from the knock features by:
(i) determining map values from a program map as a function of operating parameters of the internal combustion engine, and linking the map values additively to the knock features, or (ii) carrying out a low-pass filtering, or (iii) determining map values from a program map as a function of the operating parameters of the internal combustion engine and linking the determined map values additively to the knock features, and carrying out a low-pass filtering;

wherein the device is configured to determine further map values from a further program map as a function of the operating parameters of the internal combustion engine and the further map values are used multiplicatively to form the corrected knock features; and wherein, to form the corrected knock features, the map values are subtracted from the knock features, results of the subtraction are then low-pass-filtered, multiplication with the further map values is then carried out, and the map values are then added on again to form the corrected knock features.

\* \* \* \* \*